United States Patent

Stanley, deceased

[15] 3,635,426
[45] Jan. 18, 1972

[54] ROTARY WING TRANSPORT AIRCRAFT

[72] Inventor: Paul H. Stanley, deceased, late of Glenside, Pa. by First Pennsylvania Banking and Trust Co., executor

[73] Assignee: Autogiro Company of America, Jenkintown, Pa.

[22] Filed: Sept. 12, 1968

[21] Appl. No.: 759,829

Related U.S. Application Data

[63] Continuation-in-part of Ser. No. 503,536, Oct. 23, 1965, abandoned.

[52] U.S. Cl. ........................................244/17.11, 416/20
[51] Int. Cl. .........................................................B64c 27/18
[58] Field of Search ..............................170/135.4, 135.71; 244/17.11–17.27, 6, 7, 12, 23, 52, 51, 53–56; 416/20

[56] References Cited

UNITED STATES PATENTS

| | | | |
|---|---|---|---|
| 2,507,657 | 5/1950 | Wiessler | 244/53 X |
| 2,653,778 | 9/1953 | Bennett et al. | 244/6 |
| 3,068,647 | 12/1962 | Santamaria et al. | 244/55 X |
| 3,084,889 | 4/1963 | Irbitis | 244/55 |
| 3,186,491 | 6/1965 | Fischer | 170/135.4 |
| 3,259,343 | 7/1966 | Roppel | 244/53 |
| 3,312,429 | 4/1967 | Hull, Jr. et al. | 244/53 |
| 1,848,389 | 3/1932 | Sikorsky | 244/17.11 |
| 1,980,980 | 11/1934 | Campbell | 244/17.21 |
| 2,405,244 | 8/1946 | Stanley | 244/17.27 X |
| 2,738,147 | 3/1956 | Leech | 244/52 |
| 2,758,805 | 8/1956 | Graham | 244/52 |
| 2,780,423 | 2/1957 | DeCenzo | 244/17.27 X |
| 2,925,867 | 2/1960 | McKeggie et al. | 244/6 X |
| 2,941,749 | 6/1960 | Sullivan et al. | 244/6 |
| 2,994,495 | 8/1961 | Lubben et al. | 244/17.27 |
| 3,312,426 | 4/1967 | Fowler | 244/12 |
| 3,370,809 | 2/1968 | Leoni | 244/7 |

FOREIGN PATENTS OR APPLICATIONS

| | | | |
|---|---|---|---|
| 618,657 | 4/1961 | Canada | 170/135.4 |
| 1,095,157 | 12/1954 | France | 170/135.4 |
| 756,050 | 8/1956 | Great Britain | 170/135.4 |
| 827,852 | 2/1960 | Great Britain | 170/135.4 |
| 883,462 | 3/1943 | France | 244/17.19 |
| 717,599 | 10/1954 | Great Britain | 244/6 |

OTHER PUBLICATIONS

American Helicopter, May, 1953, pp. 6–10 and 13–14.
Flight–June 9, 1949, pp. 672–674.

*Primary Examiner*—Milton Buchler
*Assistant Examiner*—Paul E. Sauberer
*Attorney*—Synnestvedt & Lechner

[57] ABSTRACT

A rotary wing aircraft especially adapted for short haul transport service, having rotor blade jet devices providing torqueless rotor drive, outboard propulsive airscrews, and gas generators or gas turbine engines some of which provide for drive of the outboard propulsive airscrews and at least one of which provides hot effluent gas which is somewhat cooled by mixing with air or water and then fed to the rotor driving jet devices, the aircraft also having controllable means utilizing the discharge of gas generators or gas turbine engines, or the slip stream of propulsive airscrews, to provide for directional control of the aircraft.

19 Claims, 25 Drawing Figures

PATENTED JAN 18 1972
3,635,426
SHEET 1 OF 9
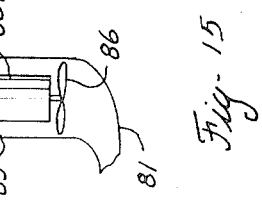
Fig-15
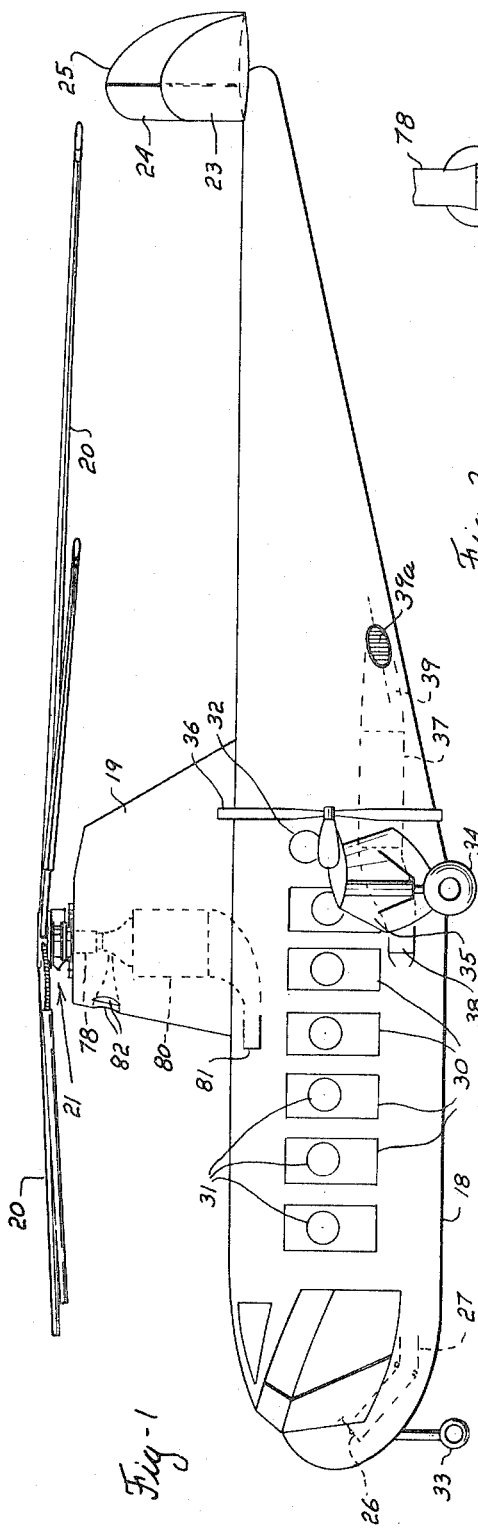
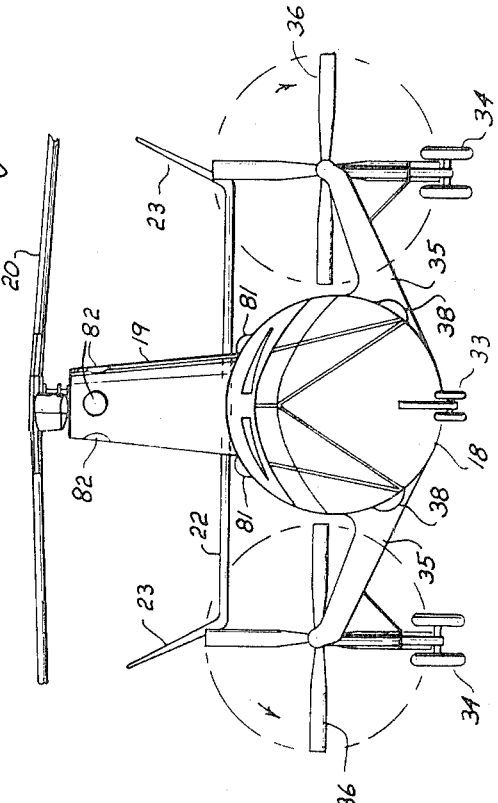
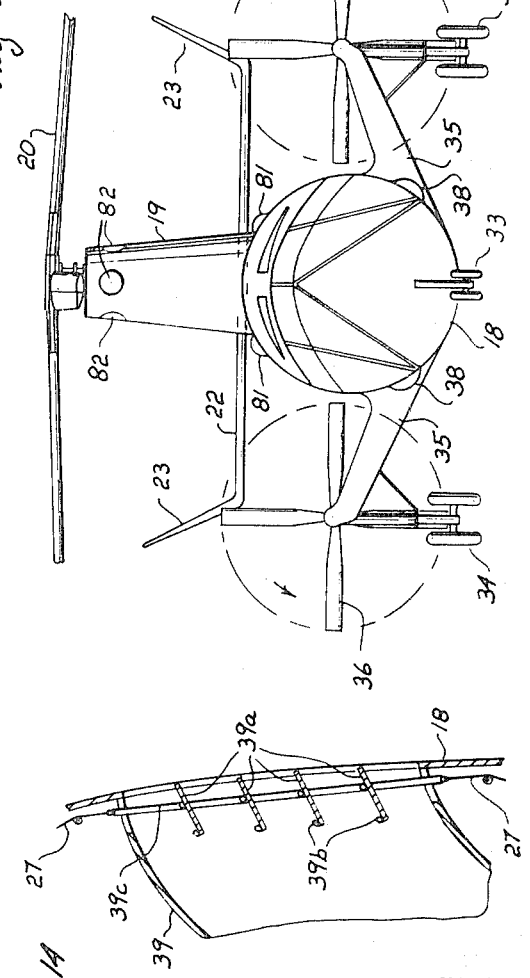
INVENTOR
PAUL H. STANLEY (DECEASED)
by FIRST PENNSYLVANIA BANKING
AND TRUST COMPANY (EXECUTOR)
BY
ATTORNEYS

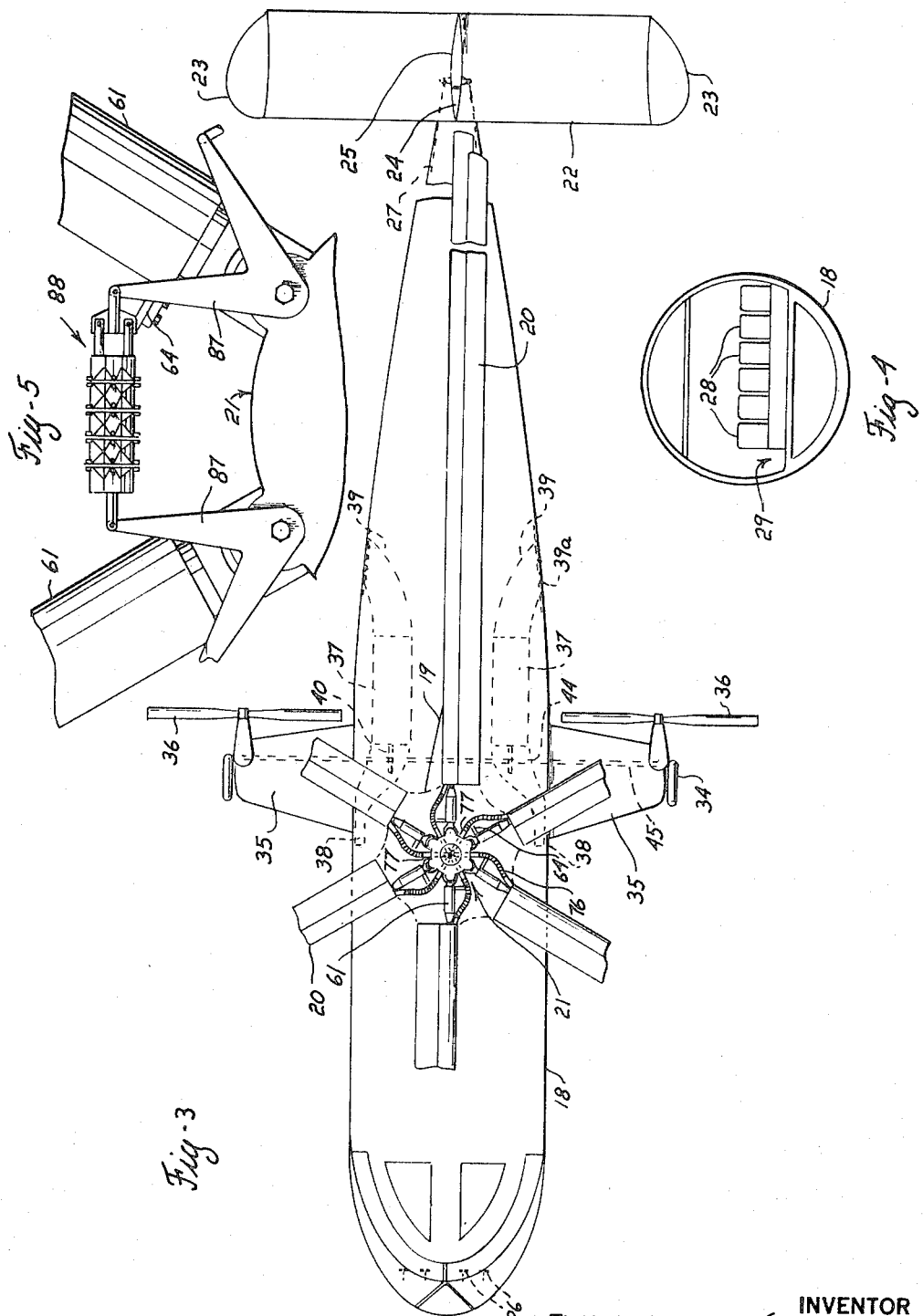

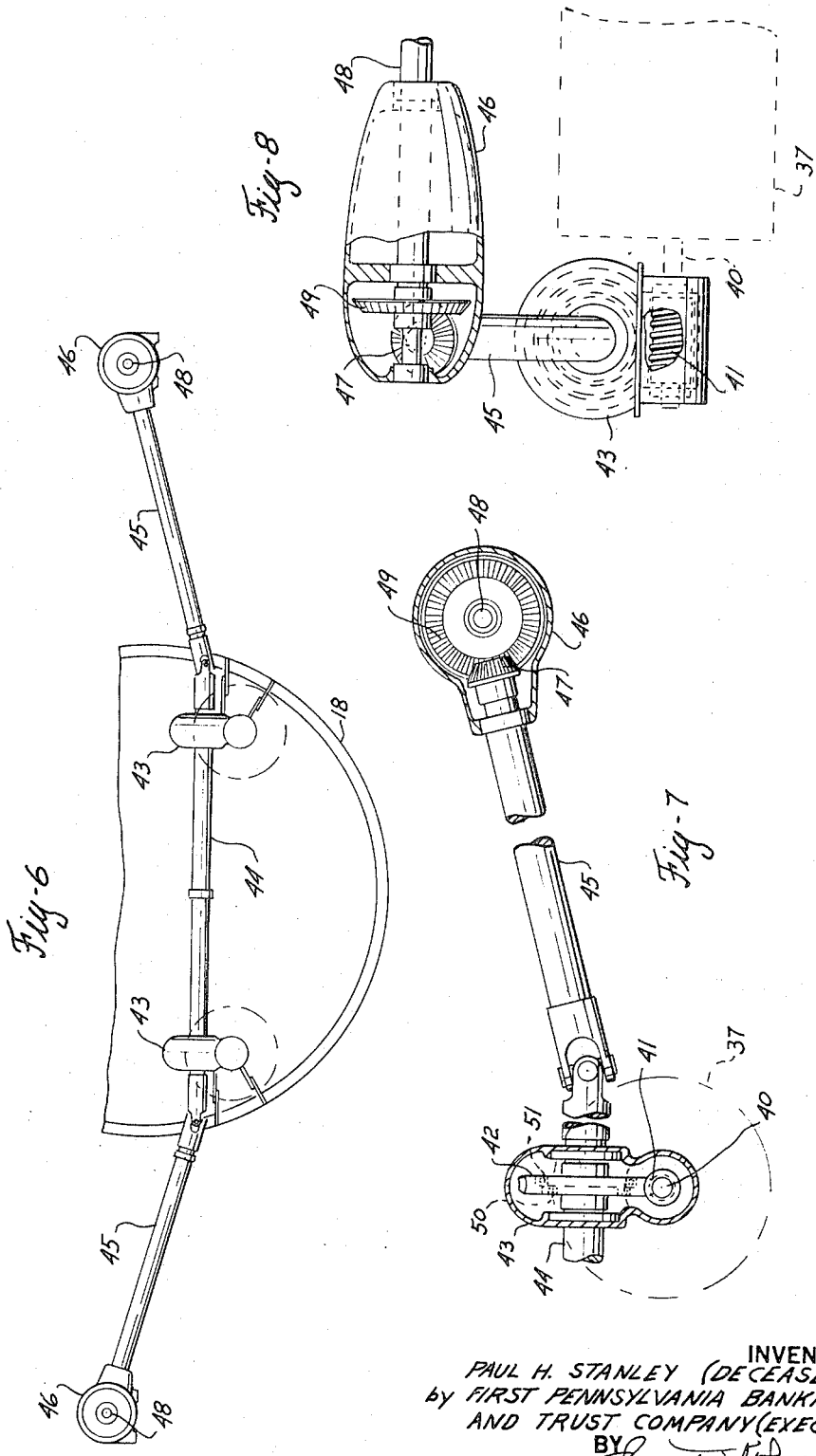

INVENTOR
PAUL H. STANLEY (DECEASED)
by FIRST PENNSYLVANIA BANKING
AND TRUST COMPANY (EXECUTOR)
BY
ATTORNEYS

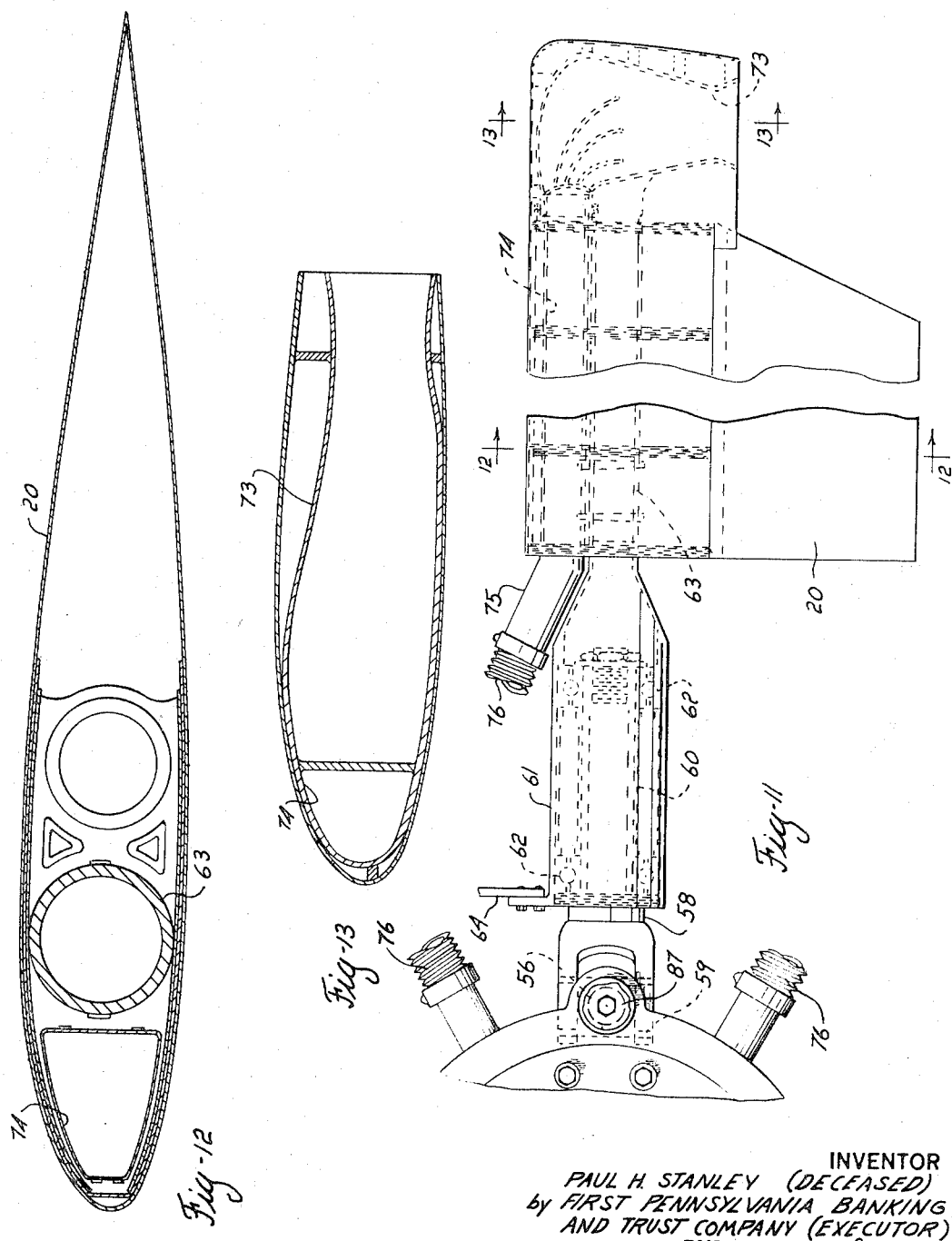

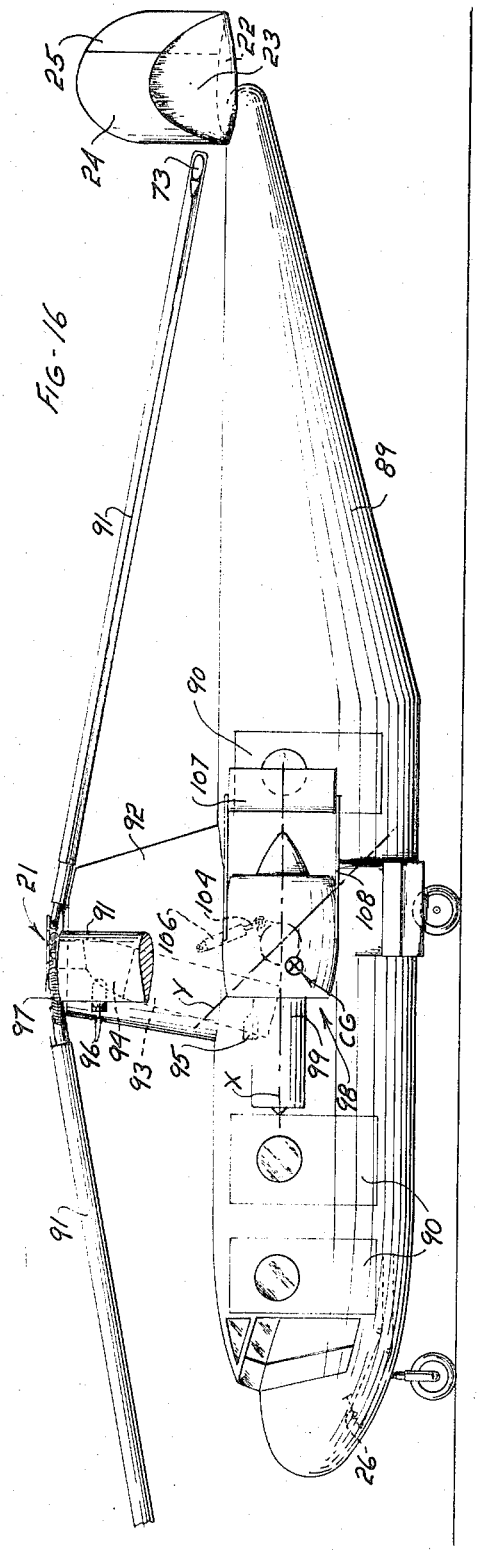
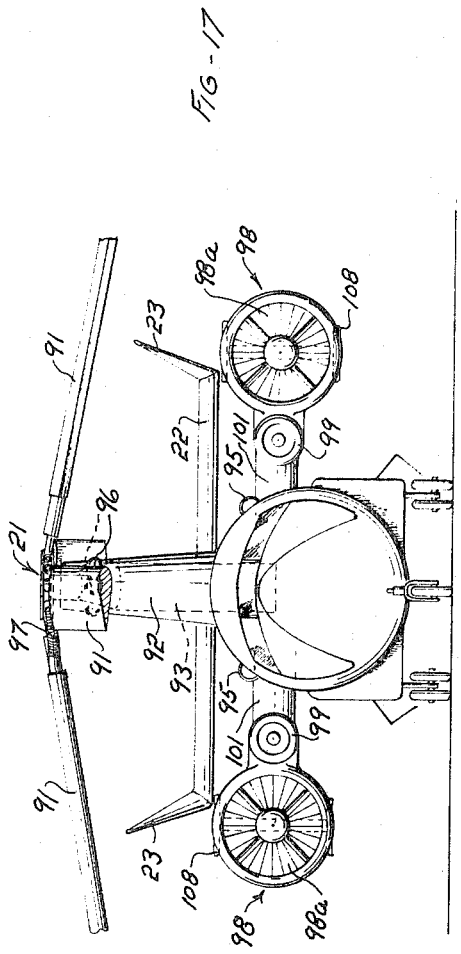

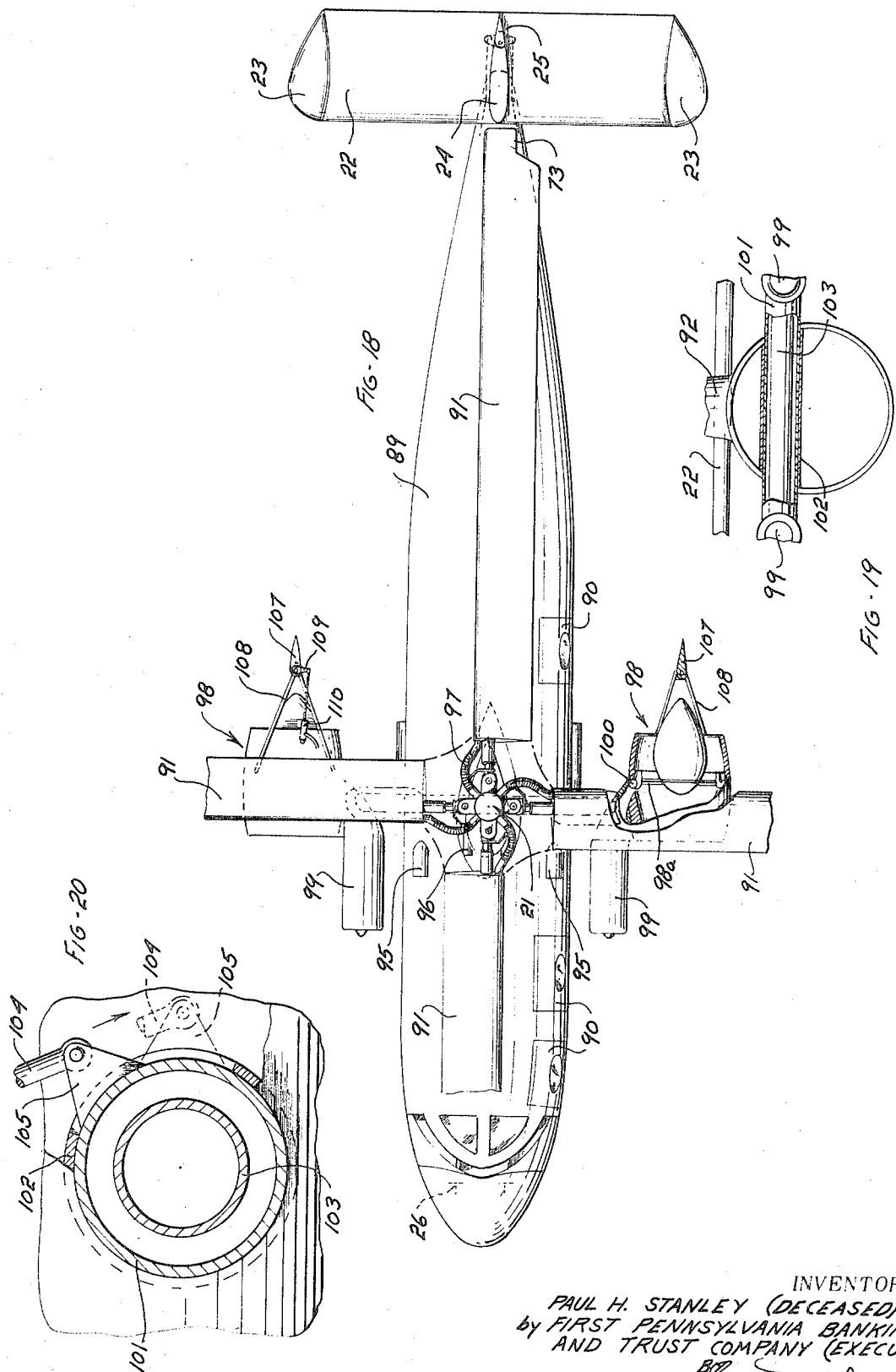

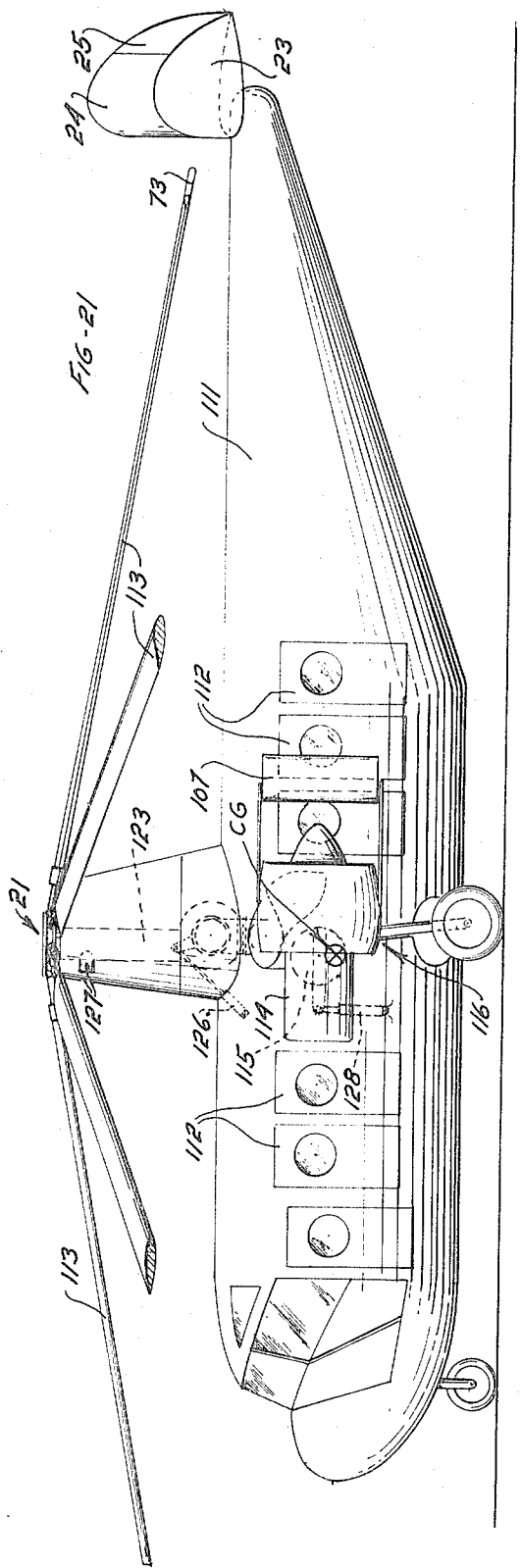
FIG-21
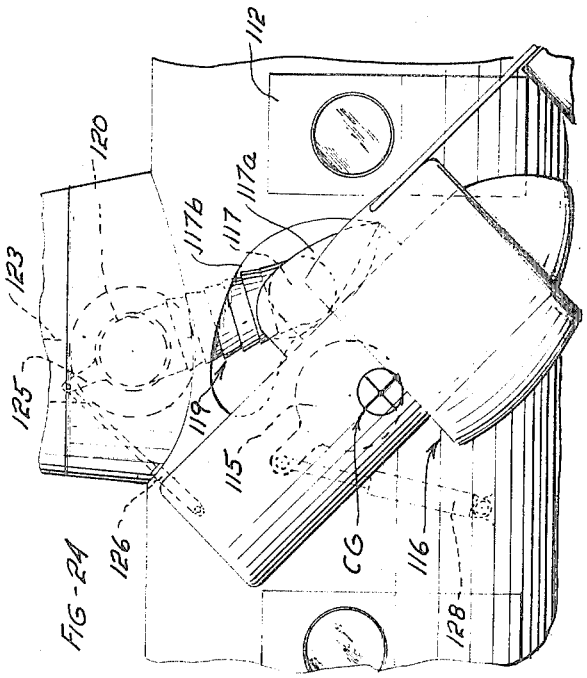
FIG-24
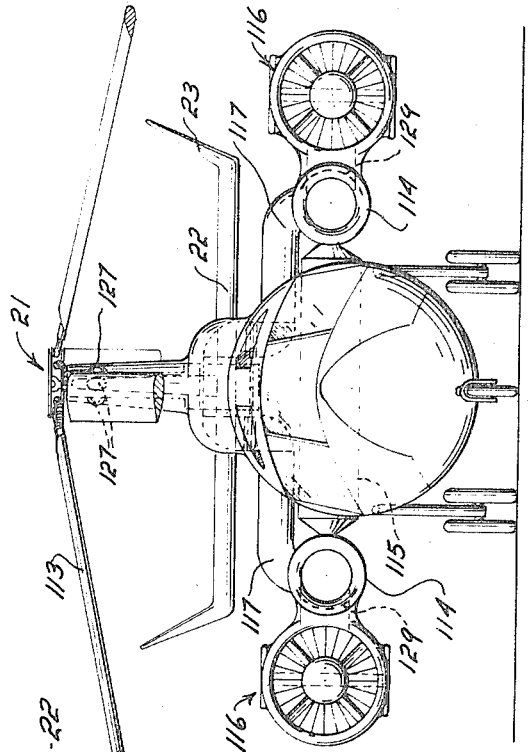
FIG-22
INVENTOR.
PAUL H. STANLEY (DECEASED)
by FIRST PENNSYLVANIA BANKING
AND TRUST COMPANY (EXECUTOR)
BY
ATTORNEYS

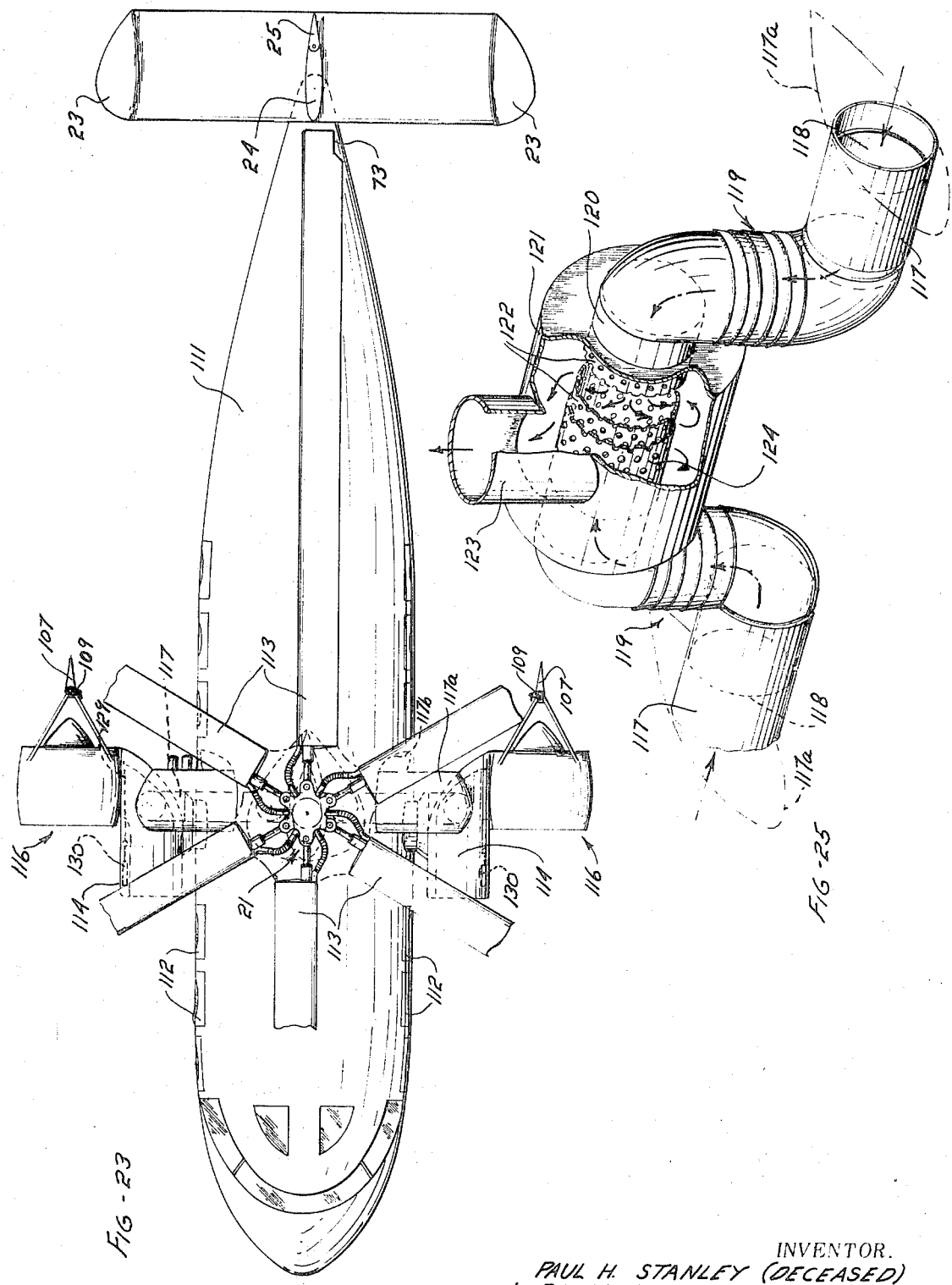

ROTARY WING TRANSPORT AIRCRAFT

The present application is a continuation-in-part of prior application, Ser. No. 503,536, filed Oct. 23, 1965.

GENERAL STATEMENT OF OBJECTS AND ADVANTAGES

This invention relates to rotary wing aircraft and is particularly concerned with aircraft of this general type especially adapted for transport use. Moreover, aircraft in accordance with the present invention are particularly well suited to what is frequently referred to as short haul transport service, especially passenger transport between cities separated by distance up to several hundred miles, for instance, up to about 500 or 600 miles.

As is well known, transport airplanes, especially with the increasing speeds of which recently and currently developed airplanes are capable, find wide applicability in the field of transport work especially on the passenger airlines, but require lengthy airport runways which are not feasible to locate near the center of even moderate sized cities.

On the other hand, and as is also well known, helicopters have great usefulness in situations requiring vertical flight capability, but helicopters ordinarily have distinctly limited cruising speeds, so that they have not found acceptance in passenger transport work for distances beyond about 30 to 50 miles.

It is the principal object of the present invention to provide transport aircraft, in the form of a rotary wing aircraft, capable of landing and takeoff either vertically or with a short run, so that lengthy airport runways are not needed, in view of which the airports used for such aircraft may be located much closer to the centers of cities, or indeed, within central city areas. The aircraft of the invention is further capable of flight at a speed substantially in excess of the typical helicopter cruising speed, for instance at a speed of the order of from 250 to 350 miles per hour, and thus the invention provides a rotary wing aircraft which is well adapted to short haul transport operation between cities separated by distance up to at least several hundred miles.

It is a further object of the invention to provide a rotary wing aircraft of the kind referred to having a flappingly pivoted bladed sustaining rotor capable of autorotative operation and capable also of rotation under the combined effect of autorotative forces and of a power drive system and preferably a torqueless power drive system, for instance a jet drive comprising jet devices mounted on the rotor, and advantageously on the rotor blades themselves. Moreover, it is also contemplated that the jet drive system provided according to a preferred embodiment of the invention be capable of effecting vertical climb of the aircraft, so that it will have the capability of operation over a wide range of flight conditions running all the way from vertical climb with the rotor fully powered, to vertical descent with the rotor either powered or completely autorotated, as well as intermediate translational flight conditions including translational flight at speeds higher than heretofore attainable with rotary wing aircraft, such high translational speeds being attained by concurrently utilizing both autorotative drive and power drive for the rotor.

The aircraft of the invention also is equipped with at least one pair of propulsive airscrews which may take either the form of bladed airscrews of conventional type, or the form of cruise fans, either ducted or otherwise arranged. Preferably the propulsive airscrews are arranged in outboard positions, with their longitudinal (or thrust) axes lying in planes offset laterally to either side of the center of gravity of the aircraft. Such airscrews constitute the principal means providing the propulsive thrust for effecting translational flight of the aircraft; and by combining, in a single aircraft, the propulsive airscrews and a sustaining rotor equipped with power drive means, in translational flight, as induced by the propulsive airscrews, the rotor speed may be brought up to a value above that ordinarily obtainable by autorotative forces alone and also higher than heretofore used in the conventional helicopter in which translational flight is induced by a horizontal component of the thrust of the sustaining rotor. By using power drive in the rotor, relatively high blade tip speeds are achievable, which tends to reduce the flapping and flexing action of the rotor blades that would otherwise be present in the higher ranges of translational speed, and the reduced blade flapping and flexing makes it possible for the aircraft to achieve higher translational speeds.

With the foregoing combination of features, rotary wing aircraft in accordance with the present invention can fly safely and efficiently at substantially higher speeds than has been practicable heretofore with rotary wing aircraft.

In accordance with still another aspect of the invention the outboard propulsive airscrews are driven by gas turbine engines or gas generators, and interconnection means is provided for assuring continuation of power to the airscrews on both sides of the aircraft, in the event of failure of any of the associated gas generators or engines. This is of advantage because, for a given power input, the propulsive airscrews operating together provide for more efficient thrust than by operating only a single airscrew from the power source. Such interconnection means also avoids undesirable yaw influences upon the aircraft in the event of failure of the gas generator or engine associated with a propulsive airscrew on one side of the aircraft.

In one embodiment of the invention these results are achieved by interconnection of the airscrews by a transmission including gearing and shafting, and in another embodiment by provision of a duct interconnecting the effluent discharge outlets of the gas generators or gas turbine engines associated with the airscrews on opposite sides of the aircraft. In both embodiments it is contemplated that the propulsive screws be rotated in opposite directions, thereby to minimize torque effects about the longitudinal axis of the aircraft.

In accordance with another aspect of the invention, controllable vanes or louvers are disposed either in the flow path of the discharged effluent from the gas turbine engines, the outlets of which are situated on opposite sides of the aircraft, or in the flow stream from the cruise fans which are situated on opposite sides of the aircraft, thus providing for deflection of the effluent or flow stream, either more or less laterally or rearwardly of the aircraft. In either case the vanes or louvers are positioned and operate in a gas flow stream setup by the gas generator or gas turbine engines. With these arrangements positive control of the aircraft in yaw is provided and is effective regardless of whether or not the aircraft is in translational flight.

The aircraft is also equipped with a controllable rudder to contribute directional control in translational flight, and the usual rudder pedals are connected not only with the rudder but also with the above-described controllable vanes or louvers so as to provide for variation in the direction of deflection of the effluent or the slip stream providing directional control moments in the standard sense, concurrently with rudder deflection and control.

The control of the aircraft in pitch and roll is preferably achieved by employment of cyclic rotor control, for instance cyclic blade pitch control in a manner now well understood in this art.

Still another object of the invention is the provision of a rotor blade jet-drive system utilizing exhaust or effluent gas from at least one gas generator or gas turbine engine, the hot effluent gas, however, being combined with air or water after discharge of the gas from the generator or engine, and the mixture of gas and air or water being delivered through a ducting system extended through the hollow interior of the rotor hub and thence through the rotor blades themselves to the rotor jet-drive devices which are desirably mounted at or near the tips of the rotor blades. Such a rotor drive system utilizes what might be termed "warm," as distinguished from "hot," energized operating fluid for powering the blade tip jets. As compared with a "hot" rotor blade jet-drive system, i.e., one in which hot effluent gas produced by a gas generator or turbine engine is supplied to the rotor blade jet devices, the "warm" system of the present invention is of distinct advantage because it affords much greater leeway in the construction and design of the rotor hub and blades. For example, those components need not be formed of materials or otherwise constructed to withstand the higher temperatures inherent in the "hot" system. Although the "warm" system reduces the total power available from the blade tip jets, as compared with the "hot" system, this reduction is more than offset by the advantage of using simplified, lighter and less expensive hub and blade construction. The "warm" system is particularly advantageous in aircraft of the type herein disclosed having propulsive airscrews which provide thrust for inducing and maintaining translational flight and which in turn sets up substantial autorotative forces in the rotor so that only a relatively small percentage of supplemental power for driving the rotor is required in order to maintain desired rotor r.p.m. even in the higher range of translational flight speeds.

As compared with a "cold" system, i.e., one in which an engine is employed to drive a separate compressor or in which compressed air is bled from the compressor stage of a gas turbine engine and with the compressed air being delivered to the blade jets, the "warm" system of the present invention is of advantage because it utilizes heat-energized gas produced by a gas generator or turbine engine. With such a system, the available jet-power engine-weight ratio is considerably greater than in the "cold" system in which only compressed air is provided for powering the blade jets.

The "warm" system of the present invention is also of advantage in comparison with a jet system in which fuel is burned in jet devices at the blade tips, there being a number of reasons for this including the problems of feeding combustible fluid to the jet burners in the blades, the problems of assuring uniform ignition and combustion in the several blade tip jets, and the high noise level of such combustion-type jets.

Since the present invention contemplates utilizing a combination of autorotative as well as jet-drive forces to rotate the rotor in translational flight, less jet power is required to drive the rotor. However, with the "warm" system, the capacity of the gas generator or gas turbine engine preferably is such as to provide adequate rotor power for effecting vertical flight of the aircraft, although it is also contemplated that for full power input to the rotor, as in vertical flight, the quantity of air or water introduced into the hot effluent gas could be reduced or eliminated entirely, thus providing a hotter feed for the jet devices during the relatively short time in which vertical flight would be required.

In one embodiment of the invention the blade tip jet-operating fluid is provided by diversion of some of the effluent gas from the gas turbine engines provided for driving the propulsive screws. In another embodiment, the jet operating fluid is provided by an additional gas generator mounted just below the hub or rotor head and positioned so that its exhaust gas outlet or duct is directed upwardly.

It is a still further object of the invention to utilize the propulsive screws to contribute some lift to the aircraft in order to supplement that derived from the sustaining rotor, at least under certain flight operating conditions, such as takeoffs and slow speed flight. For this purpose the propulsive screws, preferably with their driving turbines, are mounted for tilting movement about the transverse axis of the aircraft between a position in which the propulsive thrust is delivered primarily longitudinally of the aircraft for horizontal flight and a position for delivering thrust in an upwardly inclined direction to contribute lift to the aircraft for accelerated takeoff, or slow speed flight or even for vertical flight. This feature also reduces the total lift required from the sustaining rotor for vertical takeoff, so that the rotor power of a "warm" jet system provides sufficient power to effect vertical takeoff in combination with the lift component of the tilted cruise fans.

BRIEF DESCRIPTION OF FIGURES

How the foregoing objects and advantages are attained will appear more fully from the following description referring to the accompanying drawings in which:

FIG. 1 is a side elevation outline view of an aircraft constructed according to the present invention, portions of the forwardly projecting blades of the sustaining rotor being broken off;

FIG. 2 is a front elevation outline view of the aircraft shown in FIG. 1 but with the rotor blades extended to the sides broken away;

FIG. 3 is a top plan view of the aircraft of FIGS. 1 and 2, with only a small portion of the root end of the blades shown, except for the rearwardly extending blade, most of which appears in the figure;

FIG. 4 is a diagrammatic outline view of a transverse section of the fuselage of the aircraft, illustrating a passenger seating arrangement preferably employed;

FIG. 5 is an enlarged fragmentary plan view illustrating the connection of the root ends of two of the rotor blades to the central rotor hub and also illustrating a blade movement damper device preferably employed;

FIG. 6 is a view taken transversely through the aircraft and indicating in outline the arrangement of some of the airscrew driving parts employed and also indicating in outline a portion of the fuselage, this view being enlarged as compared with FIGS. 1, 2 and 3;

FIG. 7 is a further enlarged view of certain of the airscrew driving parts and including some parts shown in vertical section;

FIG. 8 is a view of various parts shown in FIG. 7 taken from the right of FIG. 7 and also illustrating some parts in vertical section;

FIG. 11 is an enlarged plan view of one of the rotor blades of the sustaining rotor with the main part of the blade being broken out, and also showing certain of the blade mounting parts of the rotor hub;

FIG. 12 is a transverse sectional view taken on the line 12—12 on FIG. 11 and illustrating the construction of a rotor blade usable in the aircraft of the invention, this view being on a still further enlarged scale;

FIG. 13 is a view on the scale of FIG. 12 but taken on the line 13—13 on FIG. 11 through the blade tip jet devices;

FIG. 14 is an enlarged fragmentary view, partly in horizontal section, illustrating certain controllable louver devices associated with the effluent gas discharge from turbine engines employed for driving the airscrews;

FIG. 15 is a diagrammatic view of a modified arrangement of a gas turbine engine for supplying jet operating fluid to the jet devices on the sustaining rotor blades;

FIGS. 16, 17 and 18 are side elevation, front elevation and top plan views of another form of aircraft according to the invention, having propulsive screws and turbine engines in outboard locations at opposite sides of the aircraft and mounted for tilting movement about a transverse axis, some of the rotor blades in various of these views being broken away;

FIG. 19 is a transverse outline view through the aircraft of FIGS. 16, 17 and 18, with portions of the tiltable mounting for the turbines and propulsive screws shown in vertical section;

FIG. 20 is an enlarged detailed view of certain parts incorporated in the embodiment of FIGS. 16 to 19;

FIGS. 21, 22 and 23 are side elevation, front elevation and top plan views of a third embodiment of aircraft according to the invention, also incorporating tiltable mounting means for outboard propulsive screws and driving turbines;

FIG. 24 is an enlarged fragmentary side elevation view of the propulsive screw and turbine arrangement, with these parts tilted to a different position, as compared with FIG. 21; and FIG. 25 is an enlarged isometric view of a ducting system for interconnecting the effluent discharge outlets of gas turbines at opposite sides of the aircraft of FIGS. 21, 22 and 23, FIG. 25 also showing a connection for delivering effluent gases to the rotor blade jet devices.

Figure 9:
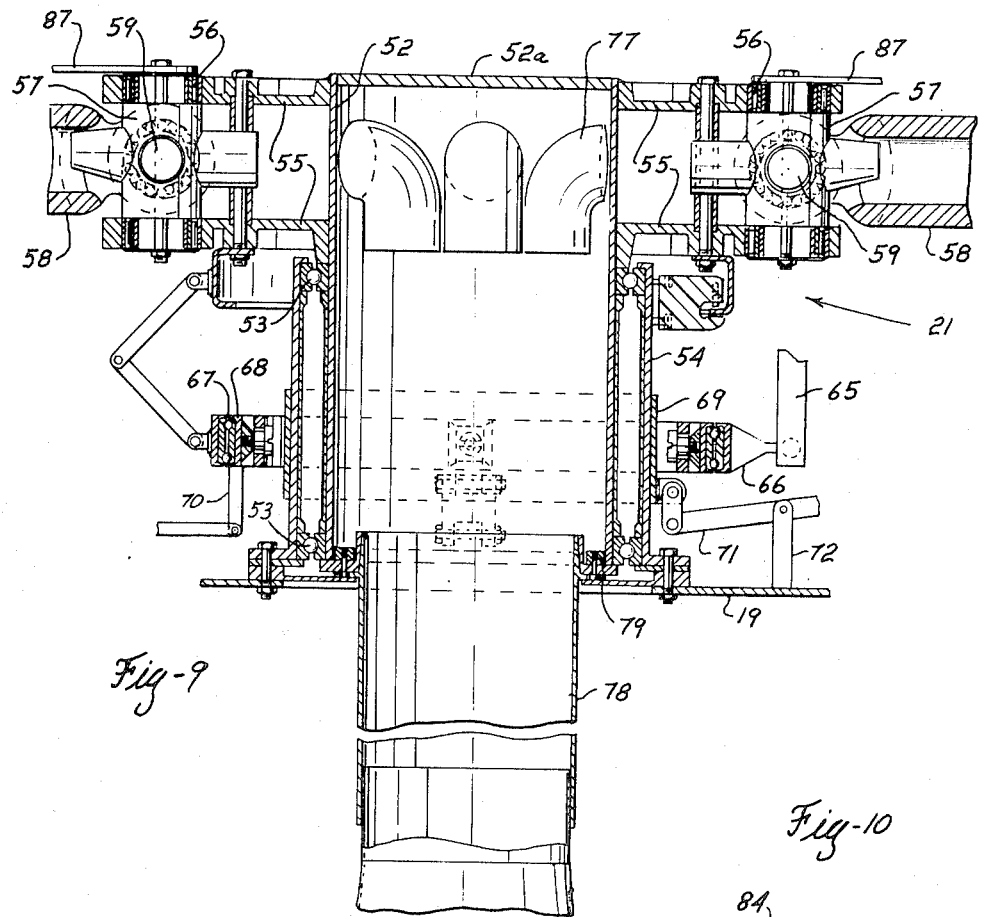
FIG. 9 is a vertical sectional view through the rotor hub and various parts associated therewith, and including an illustration in elevation of a portion of the gas supply system for the rotor blade jets.

In the following description, reference is first made to the embodiment illustrated in FIGS. 1 to 14 and also to the variation of that embodiment shown in FIG. 15. Thereafter reference will be made to the embodiment of FIGS. 16 to 20, and finally to the third embodiment of FIGS. 21 to 25.

EMBODIMENT OF FIGURES 1 TO 15

This embodiment was disclosed in applicant's copending application, Ser. No. 503,536, of which the present application is a continuation-in-part.

Reference is first made to the overall views of FIGS. 1, 2 and 3, which show the general configuration of a typical aircraft constructed according to the present invention. In this embodiment the aircraft is designed to carry about 40 passengers, in addition to the crew.

The body or fuselage of the aircraft is indicated at 18, and surmounting the body is a rotor mount or pylon 19. The rotor blades are indicated at 20, the rotor here shown incorporating six such blades, all of which are pivotally connected with the rotor hub structure which is indicated generally by the numeral 21, the rotor blades 20 and the hub structure comprise a sustaining rotor which provides the principal suspension of the aircraft in flight.

The empennage mounted toward the tail of the aircraft includes a horizontal stabilizer surface 22 having upturned dihedral tips 23 contributing stability in roll. The empennage further includes a fixed vertical stabilizer surface 24 and a manually controllable rudder 25. The rudder 25 is adapted to be controlled by the customary rudder pedals 26 through the cables 27 which are extended rearwardly from the rudder pedals for connection with the rudder in a manner well understood in this art.

FIG. 4 is a diagrammatic representation of a typical section through a main portion of the body of the aircraft in order to illustrate a preferred seating arrangement. As there shown the seating is arranged six abreast, the seats being indicated at 28, and an aisle being provided at one side as indicated at 29. It is contemplated that the body of the aircraft be provided with a separate lateral access door such as shown at 30 in FIG. 1 for each row of seats 28, each access door being provided with a window 31.

The aircraft is provided with landing gear, for instance a pair of nose wheels 33 and two pairs of laterally spaced main landing wheels 34 which latter are mounted at the outer ends of the outriggers 35 in positions rearwardly of the center of gravity of the aircraft.

The outriggers 35 further serve to mount a pair of propulsive airscrews 36 which are relied upon to provide the principal translational thrust for the aircraft. The airscrews 36 are adapted to be driven by a pair of gas turbine engines indicated in outline at 37—37. As seen from FIGS. 1 and 3, these gas turbine engines are mounted or "submerged" within the fuselage of the aircraft, being provided with air intakes 38 and exhaust gas discharge ducts 39 in the lateral or side walls of the fuselage. As best seen in FIGS. 6, 7 and 8, the power shafts 40 of the gas turbines are provided with worm gearing including worms 41 and cooperating worm wheels 42 mounted within gear housings 43. The worm wheels 42 are mounted upon a transverse shaft 44 which extends substantially through the width of the fuselage in the lower portion thereof as clearly appears in FIG. 6. A pair of shafts 45—45 are universally connected with the shaft 44 and the shafts 45 extend laterally and upwardly somewhat from the sides of the fuselage, the outer ends being journaled in the gearboxes 46 and carrying bevel gears 47, located in those gearboxes. The gearboxes 46 further serve to mount and journal the shafts 48 to which the blades of the airscrews 36 are connected, and bevel gears 49 fixed on the shafts 48 mesh with bevel gears 47 and receive power therefrom to drive the airscrews.

As seen in FIG. 7, each of the worm wheels 42 is mounted upon the shaft 44 by means of a bearing 50 and further has an overrunning or freewheeling clutch 51 interposed between the worm wheel 42 and the shaft 44. The overrunning clutches provide freedom for overrunning of the airscrews with relation to either one of the gas turbines, in the event that one of the turbines either fails or is intentionally shutdown.

From the foregoing it will be noted that the two airscrews are constantly intergeared or interconnected by means of shafts and gearing. Such gearing is designed to provide for rotation of the two airscrews 36 in opposite directions, for instance the direction indicated by the arrows in FIG. 2. In consequence of this arrangement, failure of turning off of either one of the gas turbines 37 will result in no appreciable unbalanced moment in the aircraft either in roll or in yaw.

Attention is now directed particularly to FIGS. 5, 9 and 11 which illustrate certain portions of the sustaining rotor system. As shown in FIG. 9, the rotor hub structure includes a rotative hub member 52 in the form of a cylindrical sleeve journaled by bearings 53 within the surrounding nonrotative hub member 54, the latter being fixedly connected to the top of the pylon structure, a portion of which appears at 19 in FIG. 9. The upper end of the rotor hub member 52 is closed as indicated at 52a in FIG. 9 and pairs of upper and lower lugs 55 are mounted around the hub member in positions to cooperate with the vertical pivot structures 56 which serve to journal the pivot blocks 57 on which the blade roots 58 are mounted by means of the horizontal or flapping pivot structures 59. The details of these vertical and horizontal pivot structures need not be considered herein as such structures are now well known in this art. However it is pointed out that the horizontal pivots provide freedom for upward and downward swinging or flapping movement of the sustaining rotor blades during translational flight, in order to compensate for differential lift effects experienced by the blades on the advancing and retreating sides of the rotor. The vertical or "drag" pivots provide freedom for blade movement within the general plane of rotation of the blades and thus minimize bending and other loads to which the blades would otherwise be subjected.

Each blade shank member 58 has a radially projecting spindle 60 (see FIG. 11) on which a pitch bearing housing 61 is mounted for instance by means of bearings indicated at 62. By these pitch bearing arrangements the blades are provided freedom for pitch change movements, i.e., movement about the axes extended generally radially of the hub and longitudinally of the blades themselves. It will be understood that the principal structural members or spars 63 of the blades (see FIGS. 11 and 12) are mounted on or connected with the pitch bearing housings 61, so that each blade as a whole moves with the pitch bearing housing, about the axis of the pitch bearing. Each blade is adapted to be regulated with reference to its position about the pitch axis by means of a pitch arm 64 which is connected with a pitch link 65 (see FIG. 9) the lower ends of the pitch links 65 being attached to the outer rotative ring 66 of a swash mechanism which is rotatively carried by bearing 67 on the nonrotative swash element 68 which in turn is mounted by gimbal pivots at right angles to each other, in known manner, upon the vertically movable sleeve 69 surrounding the nonrotative mounting hub member 54. Tilting of the swash members, including the rotative swash member 66 to which the pitch links and pitch arms are attached is effected by means of a pair of control arms one of which appears at 70, the other arm (not shown) being located in a plane at right angles to the arm 70, and the two arms thereby providing for tilting of the swash mechanism in any desired plane, in a manner which is well understood in this art. Additional illustration and description of a mechanism of this type may be found in Campbell U.S. Pat. No. 2,580,514 issued Jan. 1, 1952. The purpose of the tilting of the swash mechanism is to provide for cyclic variation of the rotor blade pitch angles thereby providing for attitude control of the aircraft.

The collective or mean blade pitch angle may also be regulated by vertical shifting movement of the sleeve 69 on which the gimbal assembly is mounted, this vertical shifting movement being effected by means of a lever 71 pivoted on a fixed part as at 72, and suitably connected with a control organ in the pilot's cockpit. This collective control system also need not be described in detail here but if desired reference may be had to the above mentioned Campbell patent. It is contemplated that the collective pitch control system provide for blade pitch settings adapted to effect vertical climb under power and also adapted to effect autorotative actuation of the rotor for most conditions of flight operation. The blade pitch settings will be positive, i.e., pitch angles above the zero lift setting.

It is further contemplated to provide means by which the rotor may be power driven under various flight conditions including vertical takeoffs and hovering, as well as landings and translational flight, during which latter the rotor may rotate under the combined influences of autorotative forces and power drive. In accordance with the present invention the rotor power system is of a type which is torqueless and which, therefore, will not introduce substantial yawing moments when power is being applied or as power is being discontinued. This is achieved by employment of a rotor drive system comprising jet devices preferably arranged at the rotor blade tips. An example of such a jet device on one of the blades appears in FIGS. 11 and 13 at 73. This jet device has its inlet in communication with a gas supply conduit 74 which extends longitudinally of the blade and radially inwardly thereof to a point adjacent the hub, the conduit 74 being provided at its inner end with a fitting 75 to which a flexible tube 76 is connected, the tube being extended inwardly toward the hub and positioned just in advance of its associated rotor blade for connection through the elbow or nipple 77 with the interior hollow within the rotative hub sleeve 52 (see FIGS. 3, 9 and 11).

The interior of the hub member 52 is utilized as a manifold to receive jet-operating gases from the duct 78 and to distribute the gases to the several blades so that they will all be equally driven by the blade tip jets. The upper end of the nonrotative duct 78 is mounted on the pylon structure 19, and a sealing or packing device 79 is interposed between the nonrotative duct 78 and the rotative hub member 52.

Turning again to FIG. 1, it will be seen that within the pylon 19 a gas generator or gas turbine engine 80 is mounted about a vertical axis and positioned to deliver its exhaust gases upwardly into the exhaust duct 78, which in turn communicates with the manifold within the hub.

In one embodiment (shown in FIGS. 1, 9 and 10) the gas generator or engine 80 has air intakes 81 (see also FIG. 2) delivering air into the lower end of the generator, and further has air inlets 82 delivering directly into the stream of exhaust gases delivered from the generator. The air intakes 82 should be arranged to permit the introduction of air into the energized gas stream by venturi action, which will also ensure thorough mixing. One or more of the air intakes 82 are advantageously located on the frontal area of the pylon structure so as to provide for introducing air therethrough by ram effect during translational flight, thus increasing the total volume of energized fluid for powering the blade tip jets. Suitable louvers or the like (not illustrated) are provided for either automatically or manually controlling the amount of air introduced through the intakes 82. By the secondary introduction of air through intakes 82, the temperature of the generator exhaust gases may be reduced, and the mass of the gases increased before delivery thereof through the hub and to the blade jets, thereby providing a "warm" jet-drive system for the rotor. In a typical "warm" system according to the present invention, the temperature of the generated effluent is brought down from a normal value of the order of 950° F., to a value within a range between about 500° and 800° F., for instance to about 600° F. Such reduction in temperature of the effluent gases results in the advantages described hereinabove.

Figure 10:
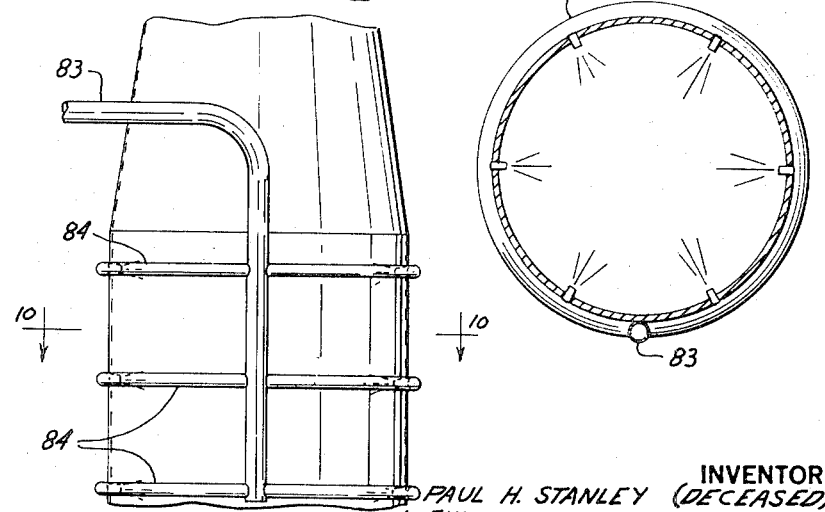
FIG. 10 is a horizontal sectional view taken as indicated by the section line 10—10 on FIG. 9.

Although the introduction of air into the hot exhaust gases before delivery thereof through the rotor hub and rotor blades to the blade tip jets represents the preferred technique for attaining the desired "warm" system, a somewhat similar effect may also be achieved by introducing a water spray into the exhaust gas stream, for instance in the manner illustrated in FIGS. 9 and 10, which show a water supply line 83 associated with a series of distributing rings 84 having appropriate jets or sprays directed inwardly so as to atomize the water as it enters the exhaust gas duct. If desired, the "warm" gas system may also be achieved by introducing some air and some water into the effluent gas.

FIG. 15 illustrates another arrangement for introducing air into the hot effluent gases. In this arrangement, the invention contemplates employment of a high bypass gas turbine engine as indicated at 80a in which the air inlet 81 delivers air not only through the turbine section of the engine, but also through a surrounding annular bypass chamber 85 and thence directly into the exhaust stream in the duct 78. In this embodiment a powered fan 86 may be employed not only to deliver air into the engine itself but also through the annular surrounding chamber. The provision for introduction of air into the exhaust gas stream, especially in the manner achieved by the high bypass type of gas turbine engine, is particularly effective in increasing the mass of the energized gases being supplied to the blade tip jets for driving the rotor. Secondary inlets such as shown at 82 (FIG. 2) may also be used in combination with the high bypass engine.

The use of a separate gas generator or turbine engine for supplying the blade tip jets and the location thereof in the rotor pylon provides a power source in close proximity to the rotor, and also provides an independent source of power for the rotor so that the aircraft may be operated as a helicopter, as well as enabling the rotor to be powered independently under various flight conditions and regardless of the translational thrust provided by the propulsive airscrews.

With such an independent power source for the rotor, the aircraft may be operated as a gyroplane without the rotor requiring any power from the engines which drive the propulsive airscrews. For example, utilizing a separate gas generator associated with the rotor, the rotor may be started and brought up to a sufficient speed to enable the aircraft to be operated as a gyroplane, utilizing either a direct or jump takeoff or a short run takeoff technique, and without directly drawing any power from the airscrew engines. In addition, the powering of the rotor by an independent power source may also be utilized to provide supplemental power to the rotor for improving performance of the aircraft when operating as a gyroplane, for example, for increasing the rate of climb on takeoff.

Still further, the independent power source for the rotor provides for rotor drive during translational flight, without diminishing the power available for propulsive thrust.

FIG. 14 illustrates an arrangement preferably employed in association with the exhaust gas ducts 39 for the gas turbine engines 37 (see FIG. 1). As shown in FIGS. 1 and 14, a plurality of vertically disposed vanes or louvers 39a are mounted within the gas discharge port of gas duct 39 located in each side of the fuselage 18. The louvers 39a have vertical mounting pivots indicated at 39b, and an operating bar 39c which extends along the outer portion of the louvers is pivotally connected with each louver, thus providing for conjoint shifting of the louvers from a position in which they direct the exhaust gas substantially transversely of the aircraft to a position in which they direct the exhaust gas well rearwardly along the sidewall of the fuselage. The bar 39c is connected to cables 27 by means of which the rudder 25 is operated by the rudder pedals 26, so that louvers 39a are moved concurrently with the rudder. The sense of hookup of the louver control arrangement is such that upon forward movement of the left-hand rudder pedal, in addition to deflecting the rudder to the left and thereby causing the aircraft to turn to the left, louvers 39a on the left side of the aircraft are shifted to the position directing the exhaust gas generally perpendicularly to the longitudinal axis of the aircraft. At the same time the corresponding louvers on the right-hand side of the aircraft are caused to move to the position deflecting the exhaust gases rearwardly of the aircraft. Since the location of the louvers is well rearwardly of the center of gravity of the aircraft as a whole, the reaction from the exhaust gases also tends to cause the aircraft to turn to the left upon deflection of the left-hand rudder pedal. Upon operation of the right-hand rudder pedal, both the rudder and the louvers operate to cause a right turn.

In the aircraft herein disclosed, the above-described control system provides directional control which is effective not only at normal translational flight speeds (when the control of the rudder itself predominates) but also at relatively low translational flight speeds (when control by the deflected exhaust gases from the turbine engines predominates). Indeed, the exhaust deflection is effective even in vertical flight, such as vertical climb or descent, under which flight conditions the rudder 25 would be of no influence.

Preferably the aircraft is also equipped with blade dampers, i.e., control devices for damping the lag-lead motions of the rotor blades about the axes of the drag pivot structures 56. This damper mechanism is illustrated in FIGS. 5 and 9, wherein bellcranks 87 are connected with the pivot parts movable with the blades in the lag-lead sense and are extended to provide points of attachment of damper devices 88 indicated generally in FIGS. 5 and 9, there being a damper device interposed between each pair of blades around the hub. The details of construction of this damper device need not be considered herein, but it is preferred to employ a damper in which the lag-lead blade motions are resisted in a nonrebounding manner. One form of dampers suitable for this purpose is disclosed in Stanley U.S. Pat. No. 3,302,726 issued Feb. 7, 1967.

EMBODIMENT OF FIGURES 16 TO 20

In this embodiment the fuselage of the aircraft is indicated at 89 and, as in the preceding embodiment, the aircraft is provided with an empennage incorporating essentially the same surfaces as those described above.

The aircraft here shown is designed for a smaller number of passengers than the first embodiment, access doors to the cabin space being indicated at 90, and there being two such access doors near the forward end of the fuselage, and one in the midregion, just to the rear of the engines an propulsive screws described below.

The sustaining rotor of this embodiment incorporates four blades 91 which are connected with a hub structure indicated generally at 21 and being of the same general construction as that described above with particular reference to FIG. 9, except that the blade mounting lugs are positioned and arranged to provide for the mounting of four, instead of six blades. The rotor hub is mounted at the top of a pylon 92 within which is arranged a gas generator or gas turbine engine indicated at 93 having its exhaust or effluent gas discharge outlet 94 presented upwardly for connection with the hollow interior of the hub structure 21 in a manner similar to that shown in FIG. 9 for the first embodiment. Air inlets supplying air to the lower or inlet end of the turbine 93 are shown at 95, being located one at each side of the fuselage. Supplemental and controllable air inlets 96 toward the upper end of the pylon structure are provided in order to deliver air into the hot effluent gas stream before entering the hollow hub. The air inlets 96, as in the first embodiment, should be arranged for air introduction under venturi action, and preferably some also arranged for air introduction under ram effect during translational flight. As in the first embodiment, flexible tubes 97 serve to connect the jet supply ducts in the rotor blades with the interior hollow of the rotor hub, in the same general manner as indicated in FIGS. 9 and 11 for the first embodiment. Blade tip jets 73 are employed as in the first embodiment.

Although the propulsive screws of the arrangement of the first embodiment comprise conventional bladed airscrews, the propulsive screws of the embodiment of FIGS. 16 to 20 take the form of cruise fans, generally indicated at 98, driven by gas generators or gas turbine engines 99. The fan blades are shown at 98a and these blades are provided with a peripheral ring of turbine blades receiving effluent gas from the generator or engine 99 through a surrounding duct or passage 100 in known manner (see FIG. 18). The exhaust or hot effluent gas is thus used to drive the fans or propulsive screws by directly utilizing the energy of the hot gases, instead of by providing a mechanical interconnection with the propulsive screws. After utilizing the energy of the effluent gas in driving the turbine blades of the cruise fans, at least part of the gas is discharged into the slip stream set up by the fans.

As will be seen from FIGS. 17, 19 and 20, the gas generators or engines 99 at opposite sides of the aircraft are mounted on the ends of a transverse tubular beam 101 which is journaled within the body of the aircraft in a sleeve 102. With the supporting structure of the fans 98 interconnected with that of the engines 99 (as indicated in FIGS. 17 and 19), the fans and engines are unitarily tiltable about the axis of the tubular mounting parts 101 and 102, and thus substantially about the transverse axis of the aircraft.

Within the tube 101 is another tubular element 103 which comprises ducting for interconnecting the effluent gas outlets of the two generators or engines 99. Thus, both the ducts 100 of the fans 98 and also the duct 103 are connected with the effluent gas outlet of each of the engines 99. In consequence of this, in the event of failure of one of the engines, the other will feed effluent gas into the transverse duct 103 and thereby supply operating fluid to both of the outboard cruise fans 98. In consequence, failure of one of the engines will not result in substantial yawing moments.

The tilting mounting provided by the journaling of the tubular member 101 within the sleeve 102 makes possible angular motion of the engine and fan units between a position in which the propulsive thrust would be delivered primarily longitudinally of the aircraft for horizontal flight, and a position in which the thrust would be delivered in a somewhat upward and forward direction so as to contribute lift to the aircraft.

As shown in FIG. 20 such tilting motion is effected and controlled by means of a link 104 which is connected with an arm 105 projecting from the tubular mount 101 through an appropriate slot formed in mounting sleeve 102. The rod 104 may be actuated and controlled by a hydraulic piston and cylinder device indicated in FIG. 16 at 106.

In a preferred embodiment the range of motion of the cruise fan axes extends from a substantially horizontal position as indicated at $x$ (see FIG. 16) to an upwardly inclined angle of about 45° from the horizontal, as indicated at $y$. With the sustaining rotor blades 91 jet driven in the manner above described and with the cruise fans tilted to the upwardly inclined angle indicated at $y$, the combined lifting force provided may be utilized to achieve vertical or substantially vertical takeoffs and, by appropriate operation of controls may also be utilized to achieve hovering flight. In such maneuvers the longitudinal axis of the aircraft would be inclined somewhat upwardly at the nose. By utilizing a portion of the thrust available in the cruise fans to supplement the sustaining or lifting force of the main rotor, it is possible to achieve good flight performance, even in vertical flight operations, without requiring as much input to the rotor itself, as would be required where the sustaining rotor is solely relied upon for supplying the total lifting force, as in the case of ordinary helicopters.

Furthermore, the capability of positioning the axes of the cruise fans substantially horizontally enables the development of translational thrust capable of inducing and maintaining translational flight speeds considerably higher than those obtainable by the conventional helicopter, in which translational flight is induced and maintained solely from a horizontal component of the lifting force of the sustaining rotor. This capability of attaining increased translational flight speeds is further enhanced as a result of employment of the rotor blade jet drive devices because, in translational flight, the jet drive force is added to the autorotative driving force, thereby enabling the attainment of higher blade tip speeds. Such higher blade tip speeds, in turn, results in minimizing flapping and flexing action of the rotor blades, and this in turn facilitates operation of the aircraft at higher translational flight speeds.

With respect to the flight controls of the aircraft of FIGS. 16 to 20, for longitudinal and lateral attitude control it is contemplated to employ cyclic rotor blade pitch control. Such controls may be of the type illustrated in FIG. 9 above. Collective pitch control is also contemplated as in the construction previously described.

The rudder 25 serves for directional control in translational flight, the rudder being operable by means of rudder pedals 26 in known manner, as described above. Directional control or control in yaw is further provided, especially in vertical flight or in low speed translational flight, by means of vanes such as indicated at 107 which are pivotally mounted on supports 108 and controlled by arms 109 directly actuable by the pilot or by piston and cylinder devices 110. The vanes 107 are positioned in the flow stream from the cruise fans and in the discharge from their driving impellers. Thus, in this embodiment the deflector vanes are positioned not only in the airflow from the fans but also in the final effluent gas used to drive the fans. The vanes 107 are desirably connected with the rudder control system so as to be actuated by the rudder pedals 26, and the control hook-up should be such that the vanes 107 and the rudder 25 are all moved in like sense for a given rudder pedal deflection. Since these vanes are mounted on the cruise fans and are therefore tilted with the cruise fans when the latter are adjusted about the transverse mounting axis, the vanes 107 remain effective in all styles of flight including vertical flight conditions in which the axes of the cruise fans are tilted upwardly, for instance to the position indicated by the line $y$ in FIG. 16.

Still further, since the effluent gas outlets for the two engines 99 are interconnected through duct 103, the vanes 107 at both sides of the aircraft will remain operative even in the event of failure of one of the engines.

As in the first embodiment described, the arrangement of FIGS. 16 to 20 also is characterized by the employment of a "warm" system for rotor jet drive, which is achieved by introducing air or water into the hot effluent gas stream before passage of the energized gas through the rotor hub and the rotor blades, and thus providing the various advantages described above.

Although the center of gravity of the aircraft as a whole will shift somewhat in position, depending upon the loading of the aircraft, the center of gravity location at cg in FIG. 16 is typical, and it will be observed that the axis of the transverse mounting element 101 lies close to the center of gravity location which is desirable in order to avoid introduction of substantial pitching moments as a result of adjustment in position of the axes or thrust lines of the cruise fans.

EMBODIMENT OF FIGURES 21 TO 25

In many respects this embodiment is similar to the embodiment of FIGS. 16 to 20, and certain details will therefore not be described again. The fuselage 111 of this embodiment is provided with six access doors 112 at each side of the aircraft, three at each side being disposed toward the front, and three at each side toward the rear of the engine and propulsive screw location.

The rotor is made up of six blades 113, as in the first embodiment, and it is contemplated that these blades be associated with a hollow central hub structure 21 of the kind already fully described. The blades are provided with jet driving devices 73 at the tips which are adapted to be supplied with operating fluid through the hub and the blades in the same manner as above indicated, but the origin of the operating fluid is different than in the earlier embodiments. Whereas in the embodiment of FIGS. 1 to 15 and 16 to 20, the driving fluid is supplied from a separate gas generator or gas turbine engine mounted within the pylon structure, in the embodiment of FIGS. 21 to 25 the operating fluid for the blade tip jets is derived from the gas generators or gas turbine engines employed for operating the propulsive airscrews.

At each side of the aircraft of FIGS. 21 to 25 a gas turbine engine 114 is tiltably mounted by means of a transverse tubular beam 115 similar to the tubular element 101 of the preceding embodiment, and a cruise fan 116 is associated with each of the engines 114 and tiltably mounted therewith. The provision for utilizing the effluent gas of the engines 114 for driving the propulsive screws or cruise fans 116 is essentially the same as described above in connection with the preceding embodiment. However, the effluent gas duct for interconnecting the gas discharge outlets of the two engines 114 is differently arranged. Instead of utilizing a duct such as shown in FIG. 20 at 103 within the mounting beam 101, the arrangement of FIGS. 21 to 25 includes a pair of ducts 117, one for each engine 114, which extend upwardly and thence inwardly into the upper portion of the fuselage 111 (see particularly FIG. 22) where they are interconnected in the upper region of the fuselage by a central ducting system as best shown in FIG. 25. Openings 117b are provided in the sides of the fuselage where the ducts 117 extend and these openings are of somewhat elliptical shape in order to accommodate the motion of the ducts 117 when the cruise fans are tilted. Any suitable closure which will accommodate the motion of the ducts 117 may be provided for the openings 117b. Each duct 117 is enclosed within a streamlined fairing 117a as illustrated in FIGS. 23 and 24 and as indicated in dot-dash lines in FIG. 25.

As seen in FIG. 25, fittings 118 at the ends of the central ducting system are telescoped within and rotatively mounted with respect to the ducts 117. The inner ends of fittings 118 are connected to flexibly jointed tubular elements 119 which in turn are connected with opposite ends of a transverse duct 120 projecting through cylindrical housing 121 supported within the upper portion of the fuselage. The interior of the housing 121 is connected by means of an upwardly extending duct 123 with the interior hollow of the hub structure 21 such as shown in FIG. 21. The portion of duct 120 within housing 121 is perforated as indicated at 122 and is surrounded by a perforated sleeve 124 which is rotatively controllable by means of the control arm 125 actuatable manually by the pilot or by a fluid pressure piston and cylinder device 126 (see particularly FIGS. 21 and 24). In FIG. 25 a portion of the duct 120 and sleeve 124 within housing 121 are shown broken away, and the gas flow pattern is illustrated by the applied arrows.

The perforations in the internal portions of duct 120 and sleeve 124 are arranged so that the gas flow from duct 120 into the interior of the cylindrical housing 121 may be cut off or may be effected to various degrees.

With the arrangement above-described the duct system including parts 117, 118, 119 and 120, serves to interconnect the effluent discharge outlets of the two gas generators 114. In addition, this system, with the controllable sleeve 124, and the surrounding housing 121, provides for delivery of a controlled amount of the effluent gas to the duct 123 for ultimate delivery to the blade tip jet devices. As in the preceding embodiments, it is contemplated to introduce air into the hot effluent gas in advance of entry of that gas into the hollow rotor hub, and for that purpose one or more air inlets such as indicated at 127 in FIGS. 21 and 22 may be employed. As with the inlets 82 and 96 shown in FIGS. 2 and 16, it is contemplated that the inlets 127 provide for introduction of air into the effluent gas by venturi action, and one or more of them are advantageously positioned to utilize the ram effect in translational flight.

In the embodiment of FIGS. 21 to 25, the tilting of the cruise fan 116 and their associated engines 114 is effected about the axis of beam 115 in a manner similar to that described above for FIGS. 16 to 20, a piston and cylinder control device 128 being provided for this purpose, as indicated in FIGS. 21 and 24. During tilting, since the ducting 117–120 interconnecting the effluent gas outlets of the engines is not concentrically arranged with the tilting axis, various of the swiveling and flexible joints of the duct system shown in FIG. 25 will appropriately flex in order to accommodate the tilting motion.

As in the embodiment of FIGS. 16 to 20, the third general embodiment also contemplates arrangement of the tilting axis close to the center of gravity of the aircraft, as indicated at CG in FIG. 21.

As the same gas generators are employed in this third embodiment to provide the operating fluid both for the cruise fans and for the blade tip jets, it is contemplated that under various flight conditions it will be desirable to curtail the delivery of the generator effluent gas to the driving turbines of the cruise fans; for example, when high power input to the rotor is required. For this purpose, a valving arrangement, as indicated diagrammatically at 129–130 in FIGS. 22 and 23, is desirably provided in the passage 131 which interconnects the gas outlet of each generator with the turbine inlet of its associated cruise fan. The valves 129, for example, slide valves operable manually by the pilot or by piston and cylinder devices 130, are adapted to control the flow of gas within the passages 131. With sleeve 124 (FIG. 25) positioned to permit gas flow into duct 123, curtailing the gas flow through passages 131 results in increased gas flow through ducts 117–120 and thence through duct 123 into the hollow rotor hub and ultimately to the blade tip jets. With the valves 129 completely closed, the entire power from the gas generators may be delivered to the rotor blade tip jets. With valves 129 partially open, and by adjusting sleeve 124 to effect more or less gas flow into duct 123, the energized gas from the generators may be divided between the two cruise fans or between the cruise fans and the rotor blade jets, as desired.

With the gas flow control arrangements as provided in this third embodiment, in the event one of the gas generators fails in flight, valves 129 and sleeve 124 may be positioned either to distribute the effluent gas from the single operating generator to both of the cruise fans, or to distribute all of the gas to the rotor blade tip jets, or to distribute the gas as may be desired between the two cruise fans and the rotor blade tip jets.

It is further noted in connection with the various arrangements of the three embodiments of the invention as hereinabove disclosed that the engines employed for powering the propulsive airscrews and also for powering the sustaining rotor are all of the same general type, i.e., gas turbine engines. Because of this engine similarity only one type of fuel need be carried on the aircraft, which is of advantage because any remaining or reserve fuel at any given time may be used for effecting powered rotor drive or for operating the propulsive airscrews, or both, thus providing complete flexibility in operating procedures.

What is claimed is:

1. A rotary wing aircraft comprising a bladed autorotatable sustaining rotor mounted to rotate about a generally upright axis, jet devices mounted on the rotor to effect substantially torqueless rotor drive, a pair of rotative propulsive screws mounted to rotate about axes lying in planes spaced at opposite sides of the center of gravity of the aircraft, a gas turbine engine having a discharge outlet through which the products of combustion are delivered as a hot effluent gas, the sustaining rotor having an interiorly hollow rotor hub, ducting connecting the discharge outlet of the engine with the hollow interior of the rotor hub, ducting connecting the hollow interior of the rotor hub with the rotor driving jets, and means for mixing air with the hot effluent gas in advance of entry thereof into the interior hollow of the rotor hub.

2. An aircraft as defined in claim 1 in which the means for mixing air with the hot effluent gas includes an air inlet located above the body of the aircraft near the plane of rotation of the sustaining rotor.

3. An Aircraft as defined in claim 1 and further including turbine blades connected with at least one of the airscrews and driven by effluent gas from said gas turbine engine, and control means for regulating the delivering of hot effluent gas from the gas turbine engines to the interior hollow of the rotor hub.

4. An aircraft as defined in claim 1 and further including a pair of gas turbine engines mounted toward opposite sides of the aircraft, and drive means powered by said pair of turbine engines and connected with the pair of airscrews to effect rotation thereof.

5. An aircraft as defined in claim 4 in which said drive means comprises mechanical power transmission mechanism connecting the airscrews with the turbines.

6. An aircraft as defined in claim 4 in which the pair of gas turbine engines have gas discharge means setting up gas flow streams at opposite sides of the aircraft, and yaw control means for the aircraft comprising controllable vanes positioned in said gas flow streams.

7. An aircraft as defined in claim 1 and further including a pair of gas turbine engines mounted toward opposite sides of the aircraft, the gas turbine engines having exhaust discharge ducts at opposite sides of the aircraft longitudinally offset from the center of gravity of the aircraft and serving to discharge turbine exhaust gases under conditions of both vertical and translational flight, and adjustable means in the exhaust gas flow path from the discharge ends of the ducts for directing the exhaust gases more or less laterally of the aircraft.

8. A rotary wing aircraft comprising a bladed autorotatable sustaining rotor having an interiorly hollow rotative hub member to which the rotor blades are pivotally connected and being provided with a downwardly extended mounting portion, a nonrotative structure surrounding the downward extension of the hollow hub member and serving to mount the hub member for rotation about a generally upright axis, the rotor being driven at least for takeoff solely by substantially torqueless drive means consisting of jet driving devices mounted on the rotor blades, a gas turbine for supplying operating fluid to the jet devices, the turbine being mounted on an upright axis below the rotor hub and having a nonrotative discharge duct extended upwardly therefrom and delivering the effluent gases upwardly into the interior hollow of the rotative hub, and branch conduit means for delivering said gases from the interior of said hub to the blade jet devices, said jet devices serving to deliver the rotor driving torque to the blades solely by virtue of discharge of said effluent gases.

9. A rotary wing aircraft according to claim 8 and further including inlet means for admitting ambient air to the effluent gases at a point intermediate the turbine and the hollow hub.

10. An aircraft as defined in claim 8 and further including propulsion and directional control means comprising a pair of propulsive screws mounted to rotate about axes lying in planes spaced at opposite sides of the center of gravity of the aircraft and providing for translational flight of the aircraft, a pair of gas turbine engines for driving the screws, the gas turbines having exhaust discharge ducts at opposite sides of the aircraft longitudinally offset from the center of gravity of the aircraft and serving to discharge the turbine exhaust gases under conditions of both vertical and translational flight, and adjustable means in the exhaust gas flow path from the discharge ends of the ducts for directing the exhaust gases more or less laterally of the aircraft.

11. A rotary wing aircraft comprising a bladed autorotatable sustaining rotor having an interiorly hollow rotative hub member to which the rotor blades are pivotably connected, a pylon extended upwardly from the body of the aircraft and providing for mounting of the rotor hub, the rotor being driven at least for takeoff solely by substantially torqueless drive means consisting of rotor driving jet devices mounted on the rotor blades, a gas turbine for supplying effluent operating fluid to the jet devices on the rotor blades, the turbine being mounted in the pylon in a position with its air inlet presented downwardly and its combustion effluent gas discharge presented upwardly, an air intake opening presented forwardly of the aircraft adjacent the base of the pylon and delivering air into the turbine inlet, an effluent gas duct delivering combustion effluent gas from the turbine discharge into the hollow hub member, and distributing connections for delivering gas from the hollow hub member to the jet driving devices on the rotor blades, said jet devices serving to deliver the rotor driving torque to the blades solely by virtue of discharge of said effluent gases.

12. An aircraft as defined in claim 11 and further including inlet means for admitting ambient air to the effluent gas at a point intermediate the turbine and the hollow hub.

13. An aircraft as defined in claim 11 and further including an air bypass channel extended from the air inlet to the gas discharge duct at a point intermediate the turbine and the hollow hub.

14. A rotary wing aircraft comprising a bladed autorotatable sustaining rotor mounted to rotate about a generally upright axis, jet devices mounted on the rotor to effect substantially torqueless rotor drive, a pair of rotative propulsive screws mounted to rotate about axes lying in planes spaced at opposite sides of the center of gravity of the aircraft, a plurality of gas turbine engines for driving the propulsive screws, the gas turbine engines setting up gas flow streams at opposite sides of the aircraft, yaw control means for the aircraft comprising controllable vanes positioned in said gas flow streams, and means mounting the propulsive screws for tilting movement in vertical planes, the controllable vanes also being mounted by said mounting means to provide for movement of the vanes with the airscrews.

15. A rotary wing aircraft comprising a bladed autorotatable sustaining rotor mounted to rotate about a generally upright axis, jet devices mounted on the rotor to effect substantially torqueless rotor drive, a pair of rotative propulsive screws mounted to rotate about axes lying in planes spaced at opposite sides of the center of gravity of the aircraft, means mounting the propulsive screws for tilting movement in longitudinal vertical planes between a position delivering propulsive thrust primarily longitudinally of the aircraft for horizontal flight and a position delivering thrust in an upward direction to contribute lift to the aircraft for acceleration of vertical flight, a duct extended transversely of the aircraft, gas turbine engines located at opposite sides of the aircraft and connected to deliver effluent gases into opposite ends of said duct, and gas operated motors for the propulsive screws connected to receive operating gas from said duct and thereby provide for drive of propulsive screws at both sides of the aircraft even in the event of failure of one of the gas turbines.

16. A rotary wing aircraft comprising a bladed autorotatable sustaining rotor mounted to rotate about a generally upright axis, jet devices mounted on the rotor to effect substantially torqueless rotor drive at least during takeoff, a pair of gas turbine engines mounted outboard of the aircraft at opposite sides thereof, rotative propulsive screws at opposite sides of the aircraft connected with the gas turbine engines to be driven thereby, and common mounting means for an engine and a connected propulsive screw at each side of the aircraft, the mounting means at each side including pivot structure providing for tilting of the engines and propulsion screws about axes extended transversely of the aircraft between a position in which the propulsion screws deliver propulsive thrust primarily longitudinally of the aircraft for horizontal flight and a position in which the propulsion screws deliver thrust in an upward direction to supplement the lift of the sustaining rotor when driven for takeoff.

17. An aircraft as defined in claim 16 in which the mounting means for the engines and propulsion screws at the opposite sides of the aircraft includes an element interconnecting the engines and propulsion screws at the two sides of the aircraft providing for common tilting motion of the engines and propulsion screws at the two sides of the aircraft.

18. A rotary wing aircraft comprising a bladed autorotatable sustaining rotor mounted to rotate about a generally upright axis, jet devices mounted on the rotor to effect substantially torqueless rotor drive, a pair of rotative propulsive screws mounted to rotate about axes spaced at opposite sides of the center of gravity of the aircraft, a plurality of gas turbine engines located outboard at opposite sides of the aircraft and having effluent gas discharge outlets located at opposite sides of the aircraft, a duct interconnecting the effluent gas outlets of engines at opposite sides of the aircraft, gas operated driving means for the propulsive screws at opposites sides of the aircraft connected to receive effluent gas from said duct thereby providing for operation of the propulsive screws at both sides of the aircraft even in the event of failure of an engine at one side, and means for tilting the propulsive screws about a transverse axis between a position delivering propulsive thrust primarily longitudinally of the aircraft for horizontal flight and a position delivering thrust in an upward direction to supplement the lift of the sustaining rotor when driven for takeoff.

19. A rotary wing aircraft comprising a bladed autorotatable sustaining rotor mounted to rotate about a generally upright axis, jet devices mounted on the rotor to effect substantially torqueless rotor drive at least during takeoff, at least one hot gas generator, rotative propulsive screws at opposite sides of the aircraft connected with at least one gas generator to be driven thereby, conduit means for delivering gas from at least one hot gas generator to the jet devices on the sustaining rotor at least during take-off, air inlet means connected with said conduit means between the gas generator and the rotor driving jets and providing for introduction of air into the conduit means to reduce the temperature of the gas before delivery to the rotor driving jets, and common mounting means for the propulsive screws including pivot structure providing for tilting of the propulsive screws about axes extended transversely of the aircraft between a position in which the propulsive screws deliver propulsive thrust primarily longitudinally of the aircraft for horizontal flight and a position in which the propulsive screws deliver thrust in an upward direction to supplement the lift of the sustaining rotor when driven for takeoff by the jet devices.

* * * * *

UNITED STATES PATENT OFFICE
CERTIFICATE OF CORRECTION

Patent No. 3,635,426          Dated January 18, 1972

Inventor(s) Paul H. Stanley, deceased, late of Glenside, Pa., by First Pennsylvania Banking and Trust Co. Executor It is certified that error appears in the above-identified patent and that said Letters Patent are hereby corrected as shown below:

Column 1, line 3, after "1965" insert --now abandoned--.

Column 1, line 34, after "of" insert --translational--.

Signed and sealed this 11th day of July 1972.

(SEAL)
Attest:

EDWARD M. FLETCHER, JR.         ROBERT GOTTSCHALK
Attesting Officer                 Commissioner of Patents